United States Patent
Zhao et al.

(10) Patent No.: US 10,642,102 B2
(45) Date of Patent: May 5, 2020

(54) LIGHT HOMOGENIZING STRUCTURE, FRONT LIGHT SOURCE AND DISPLAY DEVICE

(71) Applicants: BOE TECHNOLOGY GROUP CO., LTD., Beijing (CN); FUZHOU BOE OPTOELECTRONICS TECHNOLOGY CO., LTD., Fuqing, Fuzhou, Fujian (CN)

(72) Inventors: Hongyu Zhao, Beijing (CN); Kai Diao, Beijing (CN); Jie Liu, Beijing (CN); Zongjie Bao, Beijing (CN); Han Zhang, Beijing (CN); Yang Chu, Beijing (CN); Wenjia Sun, Beijing (CN)

(73) Assignees: BOE TECHNOLOGY GROUP CO., LTD., Beijing (CN); HUZHOU BOE OPTOELECTRONICS TECHNOLOGY CO., LTD., Fuqing, Fuzhou, Fujian (CN)

( * ) Notice: Subject to any disclaimer, the term of this patent is extended or adjusted under 35 U.S.C. 154(b) by 270 days.

(21) Appl. No.: 15/924,650

(22) Filed: Mar. 19, 2018

(65) Prior Publication Data
US 2019/0064599 A1    Feb. 28, 2019

(30) Foreign Application Priority Data
Aug. 31, 2017    (CN) .......................... 2017 1 0768684

(51) Int. Cl.
*G02F 1/1335*    (2006.01)
*G02F 1/13357*    (2006.01)
*G02B 27/14*    (2006.01)

(52) U.S. Cl.
CPC ...... *G02F 1/133615* (2013.01); *G02B 27/143* (2013.01); *G02F 1/133512* (2013.01); *G02F 2001/133616* (2013.01)

(58) Field of Classification Search
None
See application file for complete search history.

(56) References Cited

U.S. PATENT DOCUMENTS 4,798,448 A * 1/1989 van Raalte .......... G02F 1/13362
349/62
5,479,275 A * 12/1995 Abileah ............ G02F 1/133604
349/5

(Continued)

FOREIGN PATENT DOCUMENTS

CN    1492266 A    4/2004
CN    105974657 A    9/2016

(Continued)

OTHER PUBLICATIONS

First Office Action for CN Appl. No. 201710768684.3, dated Aug. 27, 2019.

*Primary Examiner* — Elmito Breval
(74) *Attorney, Agent, or Firm* — Foley & Lardner LLP (57) ABSTRACT

The present disclosure provides a light homogenizing structure, a front light source and a display device. The light homogenizing structure comprises a transparent substrate and a plurality of light homogenizing units arranged on a surface of the transparent substrate facing the display panel; wherein a surface of each of the light homogenizing units away from the transparent substrate is a reflective surface tilted relative to the transparent substrate, light rays emitted from the light-emitting unit facing a light entry surface of the light homogenizing structure are incident into the display panel after being reflected on the reflective surface, the light entry surface is other than a surface of the light homogeniz- (Continued)

ing structure facing the display panel and its opposite surface, and an orthographic projection of one of the light homogenizing units on the display panel is located on a border between pixels of the display panel.

20 Claims, 4 Drawing Sheets

(56) References Cited

U.S. PATENT DOCUMENTS

| | | | | |
|---|---|---|---|---|
| 8,206,020 | B2* | 6/2012 | Nagata | G02B 6/0028 362/259 |
| 8,979,344 | B2* | 3/2015 | Chen | G02B 6/0035 362/609 |
| 2005/0140846 | A1* | 6/2005 | Lubart | G02B 5/00 349/62 |
| 2017/0242302 | A1* | 8/2017 | Asakawa | G02F 1/133528 |
| 2017/0315402 | A1* | 11/2017 | Kashiwagi | G02F 1/133606 |

FOREIGN PATENT DOCUMENTS

| | | |
|---|---|---|
| CN | 106950641 A | 7/2017 |
| JP | 2001-215503 A | 8/2001 |
| JP | 2016-157555 A | 9/2016 |

* cited by examiner

LIGHT HOMOGENIZING STRUCTURE, FRONT LIGHT SOURCE AND DISPLAY DEVICE

CROSS-REFERENCE TO RELATED APPLICATIONS

This application claims priority to and the benefit of Chinese Patent Application No. 201710768684.3 filed on Aug. 31, 2017, which is hereby incorporated by reference in its entirety as a part of the present application.

TECHNICAL FIELD

The present disclosure relates to a light homogenizing structure, a front light source and a display device.

BACKGROUND

With the development of display technologies, various display devices emerge endlessly, wherein the reflective display device receives more and more attentions from people. The reflective display devices can perform the display with the help of light in an external environment. In order to guarantee the display effect of the reflective display device when the light in the external environment is not good enough, a front light source is often added to assist the reflective display device in display.

In related technologies, the front light source generally comprises a light guide plate and a light-emitting unit, wherein the light guide plate has a dot structure on a side surface facing the display panel, and light rays emitted from the light-emitting unit enter the display panel after being diffusively reflected on the light guide plate.

SUMMARY

Some embodiments according to the present disclosure provide a light homogenizing structure arranged on a display side of a display panel, comprising:

a transparent substrate and a plurality of light homogenizing units arranged on a surface of the transparent substrate facing the display panel;

wherein a surface of each of the light homogenizing units away from the transparent substrate is a reflective surface tilted relative to the transparent substrate, light rays emitted from the light-emitting unit facing a light entry surface of the light homogenizing structure are incident into the display panel after being reflected on the reflective surface, the light entry surface of the light homogenizing structure is a surface of the light homogenizing structure other than the surface facing the display panel and its opposite surface, and an orthographic projection of one of the light homogenizing units on the display panel is located on a border between pixels of the display panel.

Some embodiments according to the present disclosure provide a front light source comprising the aforementioned light homogenizing structure and a light-emitting unit arranged on a side of the light homogenizing structure.

Some embodiments according to the present disclosure provide a display device comprising a display panel and the aforementioned front light source.

DETAILED DESCRIPTION

In order to make the objectives, technical solutions, and advantages of the present disclosure clearer, embodiments of the present disclosure are further described in detail in the following in combination with the accompanying drawings.

The reflective display device is a display device that can perform the display with the help of light in an external environment. In order to guarantee the display effect of the reflective display device when the light in the external environment is not good enough, a front light source is often added to assist the reflective display device in display.

In the related technologies, the front light source generally comprises a light guide plate and a light-emitting unit, wherein the light guide plate is arranged on a side on which a light entry surface of the display panel is disposed, and the light-emitting surface of the light-emitting unit faces a side surface of the light guide plate which is a light entry side of the light guide plate. The light rays emitted from the light-emitting unit can be incident into the light guide plate from the side surface and transmitted in the light guide plate. The surface of the light guide plate has a dot structure which generally comprises a plurality of pits formed on the surface of the light guide plate. When the light rays are transmitted in the light guide plate, diffuse reflections can occur at the pits, such that the light rays enter the display panel to thereby provide a light source for the display panel. However, when the display device using the front light source displays a picture, as the light guide plate is arrange on the display side of the display panel, when the light rays emitted from the display panel pass through the light guide plate, the dot structure on the light guide plate will produce a granular sensation on the displayed picture, resulting in a lower definition. In addition, when the light rays are transmitted in the light guide plate in a direction away from the light-emitting unit (to the distal end), as the light guide plate will absorb a part of blue light in the light rays in the course of light transmission, the blue light component in the light rays transmitted to the distal end is reduced, whereby the whole picture is uneven in color.

Figure 1A:
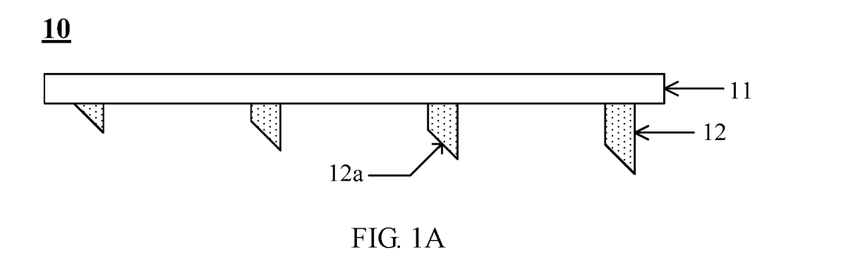
FIG. 1A is a schematic diagram showing a structure of a light homogenizing structure provided according to one or more embodiment of the present disclosure.

In view of the above contents, the embodiments of the present disclosure provide a light homogenizing structure. The light homogenizing structure is arranged on a display side of a display panel, and as shown in FIG. 1A, the light homogenizing structure 10 may comprise:

a transparent substrate 11 and a plurality of light homogenizing unis 12 arranged on a surface of the transparent substrate 11 facing the display panel.

Alternatively, the transparent substrate may be made of a glass material, or a transparent material such as polymethyl methacrylate (briefly referred to as PMMA). The embodiments of the present disclosure are not limited to it.

A surface of each of the light homogenizing units 12 away from the transparent substrate 11 is a reflective surface 12a tilted relative to the transparent substrate 11. Light rays emitted from the light-emitting unit on a side of the light homogenizing structure 10 are incident into the display panel after being reflected on the reflective surface 12a, and an orthographic projection of the light homogenizing unit 12 on the display panel is located on a border between pixels of the display panel. The light entry surface of the light homogenizing structure 10 refers to a surface of the light homogenizing structure other than the surface facing the display panel and its opposite surface. In some embodiments of the present disclosure, a black matrix is disposed at the border between pixels of the display panel, and thus the orthographic projection of the light homogenizing unit on the display panel is located within a region of the display panel in which a black matrix is disposed.

In some embodiments according to the present disclosure, an orthographic projection of the light homogenizing unit on the display panel can coincide with the region of the display panel in which the black matrix is disposed. In some embodiments according to the present disclosure, an orthographic projection of the light homogenizing unit on the display panel can be less than an area of the region of the display panel in which the black matrix is disposed. The embodiments of the present disclosure are not limited to it.

Figure 1B:
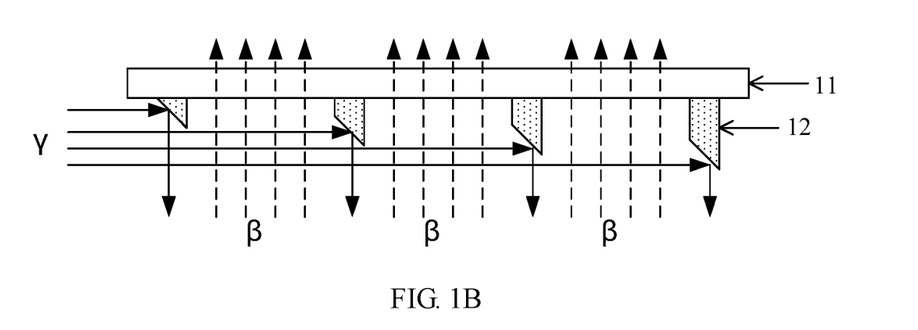
FIG. 1B is a schematic diagram showing light transmission in a light homogenizing structure provided according to one or more embodiment of the present disclosure.

Illustratively, as shown in FIG. 1B, after the light ray γ emitted from the light emitting element (not shown in the figures) located on a side of the light homogenizing structure is irradiated on the reflective surface of the light homogenizing unit 12, it is reflected on the reflective surface and is incident to the display panel (not shown in the figures) to provide a light source for the display panel. When the display panel displays a picture, a emitted light ray β transmits through the transparent substrate 11.

To sum up, the light homogenizing structure provided according to the embodiments of the present disclosure comprises a plurality of light homogenizing units on the transparent substrate, and after the light rays emitted from the light emitting element are reflected on the reflective surface of the light homogenizing unit, they are incident into the display panel to provide a light source for the display panel. Since an orthographic projection of the light homogenizing unit on the display panel is located on a border between pixels of the display panel, the light rays emitted from the display panel are not affected by the light homogenizing unit and can directly transmit through the transparent substrate, which guarantees the definition of the picture and improves the display effect of the display panel. Moreover, as the transmission medium is air when the light rays are transmitted in the light homogenizing structure, as compared with the light guide plate, the absorption degree of the air with respect to the blue light component in the light rays is far less than the absorption degree of the light guide plate with respect to the blue light component in the light rays. Therefore, the light homogenizing structure provided by the embodiment of the present disclosure can improve color uniformity of the picture on the display panel.

Alternatively, the plurality of light homogenizing units 12 can be evenly arranged on the transparent substrate 11, but the embodiment of the present disclosure is not limited to it.

Alternatively, the structure of the light homogenizing unit can be varied, and the embodiment of this disclosure is illustrated by using the following two types of light homogenizing unit as an example.

Figure 2A:
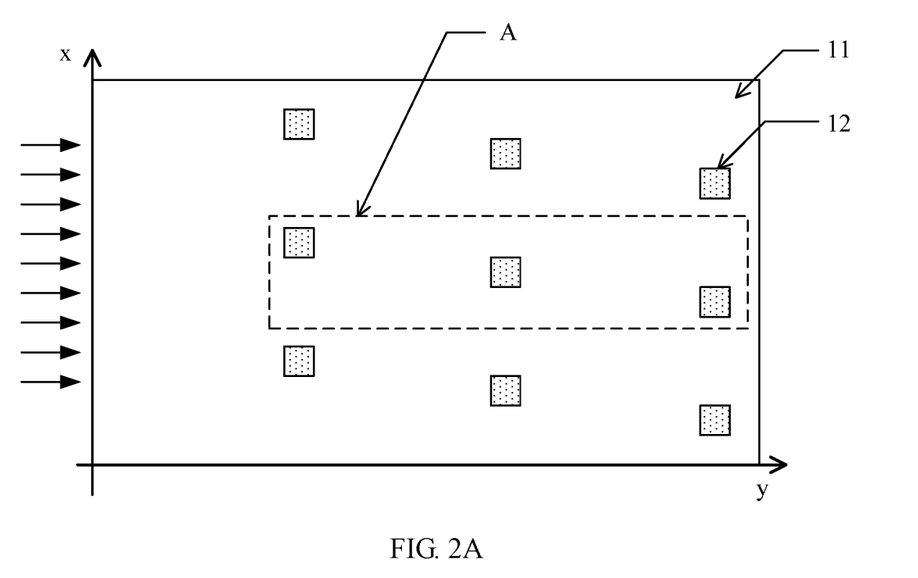
FIG. 2A is a bottom view of a light homogenizing structure provided according to one or more embodiment of the present disclosure.

The structure of the first type of light homogenizing unit is shown in FIG. 2A. FIG. 2A is a bottom view of the light homogenizing unit. The light homogenizing unit is a columnar structure, and one end of each columnar structure 12 is arranged on the transparent substrate 11, and the other end thereof is provided with the reflective surface.

The plurality of light homogenizing units specifically are a plurality of columnar structure groups A arranged in a first direction X, each of which comprises at least one columnar structure 12 arranged in an array in a second direction Y. The first direction x is parallel to the light entry surface of the light homogenizing structure, and the second direction y is perpendicular to the light entry surface of the light homogenizing structure.

Alternatively, when observed in the second direction, at least two columnar structures 12 in each columnar structure group A can be arranged in a staggered manner. When the columnar structure group A comprises a plurality of columnar structures 12, part of the columnar structures in each columnar structure group A are staggered, or all columnar structures in each columnar structure group A are staggered, and the embodiment of the present disclosure is not limited to it. Part of the columnar structures in each columnar structure group A are staggered, that is, at least two columnar structures in the same columnar structure group are not on the same straight line extending in the second direction. All columnar structures in each columnar structure group are staggered, that is, any two columnar structures in the same columnar structure group are not on the same straight line extending in the second direction. When observed in the second direction, at least two columnar structures in each columnar structure group A are staggered, such that a columnar structure farther from the light-emitting unit is not shielded by a columnar structure closer to the light-emitting unit, so that the columnar structure farther from the light-emitting unit can receive the light rays emitted from the light-emitting unit. Alternatively, the light rays emitted by the light-emitting unit can evenly reach a slope of each columnar structure, such that the light rays can be evenly reflected into the display panel, thereby improving the homogeneity of the light exited from the display panel.

In some embodiments of this disclosure, the reflective surfaces of the plurality of columnar structures in each columnar structure group can be not parallel with each other. Illustratively, as shown in FIG. 2A, one column structure group can comprise three columnar structures, and the three columnar structures are staggered in order from bottom to top and arranged on the transparent substrate. By adjusting an angle of the reflective surface of the columnar structure, the light rays reflected from the reflective surface are irradiated onto a target irradiation area of the display panel as far as possible. For example, the reflective surface of each columnar structure can be focused on a central region of the target irradiation region. Alternatively, the target irradiation region can be the region of one pixel, such that the light rays reflected on the reflective surface can be evenly irradiated onto the target irradiation region to guarantee the homogeneity of the light exited from the display panel.

Alternatively, the display panel may comprise a plurality of pixel units arranged in an array, each of which can comprise a red pixel, a green pixel, and a blue pixel. A pixel in the display panel is also a red pixel, or a green pixel, or a blue pixel. The columnar structure can be set to correspond, on a one-to-one basis, to the pixel in the display panel, that is, one columnar structure correspondingly provides a light source for one pixel such that the light homogenizing structure provides light with the same intensity for each pixel.

Figure 2B:
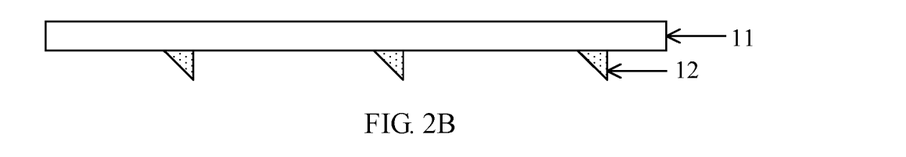
FIG. 2B is a sectional schematic diagram of the light homogenizing structure shown in FIG. 2A in a second direction.

FIG. 2B is a sectional schematic diagram of the light homogenizing structure shown in FIG. 2A in the second direction y. Alternatively, as shown in FIG. 2B, the plurality of columnar structures 12 in the same column structure group can have the same height. Since, when observed in the second direction, the plurality of columnar structures in each columnar structure group are staggered, when all the columnar structures have the same height, light rays can be also irradiated onto the slope of each columnar structure. Thus, thinning of the light homogenizing structure can be realized while ensuring that the light rays are reflected evenly onto the display panel.

As another alternative embodiment, the heights of the plurality of columnar structures in the same columnar structure group can be also increased successively in a direction away from the light-emitting unit. That is, a column structure farther from the light-emitting unit is higher in height. At this time, the plurality of columnar structures in each columnar structure group can be staggered or arranged in a straight line.

In some embodiments of this disclosure, angles between the reflective surfaces of at least two columnar structure in each columnar structure group and the transparent substrate can be decreased successively in a direction away from the light-emitting unit. In other words, the farther the distance from the light-emitting unit is, the higher the column structure becomes, and the smaller the angle between the reflective surface and the transparent substrate becomes. This is because as the height of the columnar structure increases, the distance between the reflective surface and the display panel becomes shorter, and at this time the angle between the reflective surface and the transparent substrate can be reduced, thereby reflecting the light from the light-emitting unit onto the corresponding pixel on the display panel in a shorter distance.

Figure 3:
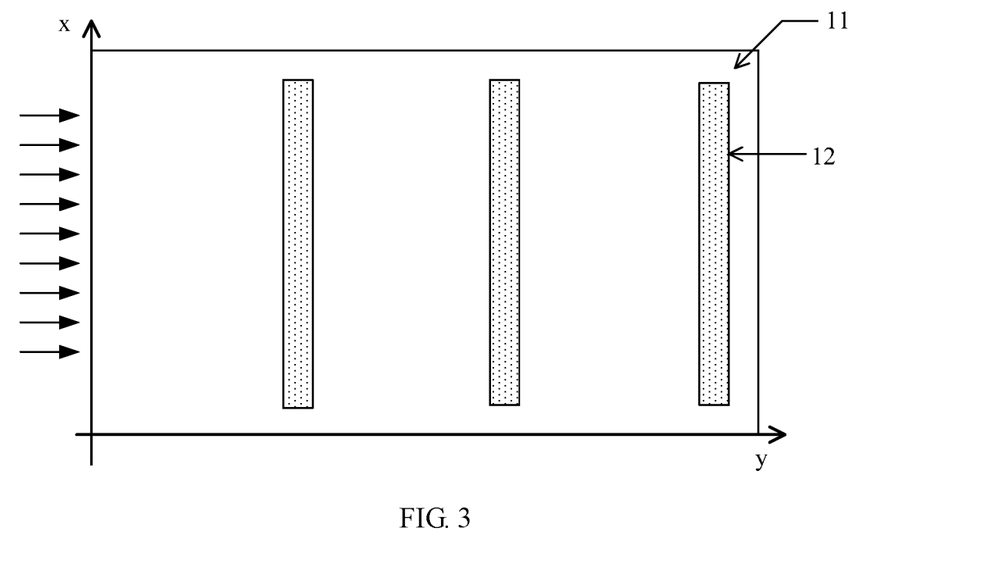
FIG. 3 is a bottom view of a light homogenizing structure provided according to one or more embodiment of the present disclosure.

The structure of the second type of light homogenizing unit is shown in FIG. 3. FIG. 3 is a bottom view of the light homogenizing unit. The light homogenizing unit is a strip structure, wherein one surface of each strip structure 12 is arranged on the transparent substrate 11, and the other surface opposite to the surface arranged on the transparent substrate 11 is provided with the reflective surface.

The plurality of light homogenizing structures specifically are a plurality of strip structures 12 extending in the first direction x and arranged in the second direction y. The first direction x is parallel to the light entry surface of the light homogenizing structure, and the second direction y is perpendicular to the light entry surface of the light homogenizing structure.

Alternatively, the cross-section of the light homogenizing structure shown in FIG. 3 in the second direction y can refer to FIG. 1A. As shown in FIG. 1A, the heights of the plurality of strip structures 12 are gradually increased in the direction away from the light-emitting unit. The light rays emitted by the light-emitting unit can reach the slope of each strip structure, and further the light rays can be evenly reflected into the display panel, thereby improving the homogeneity of light exited from the display panel.

Alternatively, in the embodiments of this disclosure, the degree of tilt of the reflective surface of each light homogenizing unit relative to the transparent substrate may be the same or different. In some embodiments of this disclosure, the degree of tilt of the reflective surface of the light homogenizing unit relative to the transparent substrate can be set according to the actual needs. For example, the degree of tilt of the reflective surface of the light homogenizing unit relative to the transparent substrate can be set so that the light homogenizing structure provides light with the same intensity for each pixel. Illustratively, the angle between the reflective surface and the transparent substrate can be in the range of 30°~45°.

In some embodiments of this disclosure, the angles between the reflective surfaces of at least two strip structures and the transparent substrate can be decreased successively in a direction away from the light-emitting unit. In other words, the farther the distance from the light-emitting unit is, the higher the strip structure becomes, and the smaller the angle between the reflective surface and the transparent substrate becomes. This is because, as the height of the strip structure increases, the distance between the reflective surface and the display panel becomes shorter, and at this time the angle between the reflective surface and the transparent substrate can be reduced, so that the light from the light-emitting unit can be reflected onto the corresponding pixel on the display panel in a shorter distance.

In addition, in the embodiments of this disclosure, the angle between the reflective surface and the transparent substrate can be positively correlated with the area of the pixel, that is, the larger the pixel area is, the greater the angle between the reflective surface and the transparent substrate becomes. In addition, the area of the reflective surface can also be positively correlated with the pixel area, that is, the larger the pixel area is, the larger the area of the reflective surface becomes, but the embodiments of this disclosure are not limited to it.

Figure 4:
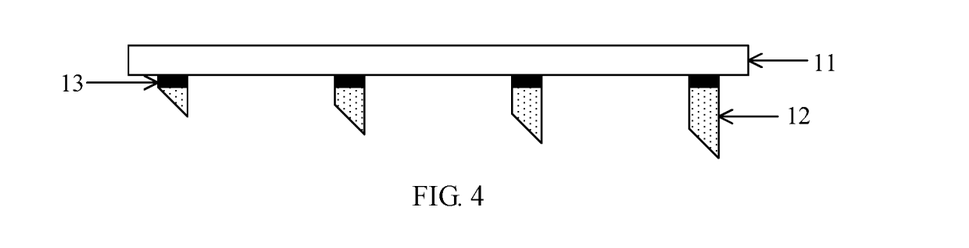
FIG. 4 is a schematic diagram showing a structure of a light homogenizing structure provided according to one or more embodiment of the present disclosure.

In some embodiments of this disclosure, as shown in FIG. 4, a light shading coating 13 can be arranged between the transparent substrate 11 and the light homogenizing structure 12, and an orthographic projection of the light shading coating 13 on the transparent substrate 11 overlaps at least partially with an orthographic projection of the light homogenizing structure 12 on the transparent substrate 11.

The orthographic projection of the light shading coating on the transparent substrate can completely coincide with the orthographic projection of the light homogenizing structure on the transparent substrate, or the orthographic projection of the light shading coating on the transparent substrate can comprise the orthographic projection of the light homogenizing structure on the transparent substrate, or the orthographic projection of the light shading coating on the transparent substrate can be located within the orthographic projection of the light homogenizing structure on the transparent substrate, and the embodiments of this disclose are not limited to it. By arranging the light shading coating between the transparent substrate and the light homogenizing unit, the light homogenizing unit can be hidden, so as to guarantee the display effect of the display panel and improve user experience.

Alternatively, the light homogenizing unit can be made from a non-transparent material and the slope can be coated with a reflective material to form a reflective surface. Therefore, the light homogenizing unit can be hidden while providing a light source for the display panel, which guarantees the display effect of the display panel and improves the user experience.

To sum up, the light homogenizing structure provided according to the embodiments of the present disclosure comprises a plurality of light homogenizing units on the transparent substrate, and after the light rays emitted from the light emitting element are reflected on the reflective surface of the light homogenizing unit, they are incident into the display panel to provide a light source for the display panel. Since an orthographic projection of the light homogenizing unit on the display panel is located on a border between pixels of the display panel, when the display panel displays a picture, in addition to the guaranteed light homogeneity, the light rays emitted from the display panel are not affected by the light homogenizing unit and can directly transmit through the transparent substrate, which guarantees the definition of the picture and improves the display effect of the display panel. Moreover, as the transmission medium is air when the light rays are transmitted in the light homogenizing structure, as compared with the light guide plate, the absorption degree of the air with respect to the blue light component in the light rays is far less than the absorption degree of the light guide plate with respect to the blue light component in the light rays. Therefore, the light homogenizing structure provided by the embodiment of the present disclosure can improve color uniformity of the picture on the display panel.

Figure 5A:
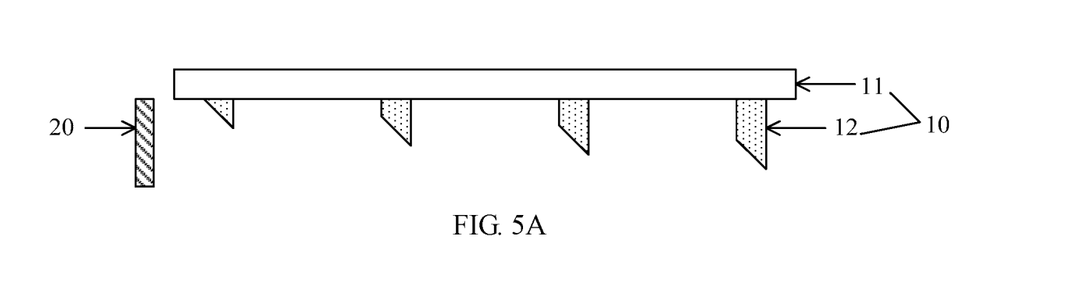
FIG. 5A is a schematic diagram showing a structure of a front light source provided according to one or more embodiment of the present disclosure.

An embodiment of this disclosure provides a front light source arranged on the display side of the display panel. As shown in FIG. 5A, the front light source comprises a light homogenizing structure 10 and a light-emitting unit 20 arranged on a side of the light homogenizing structure 10. The light homogenizing structure 10 can be a homogeneous structure as shown in FIG. 1A, FIG. 2A, FIG. 3-1 or FIG. 4.

In some embodiments of this disclosure, the light-emitting angle of the selected light-emitting unit is less than a preset angle threshold. The preset angle threshold can be determined according to the thickness of the light homogenizing structure (the height of the light homogenizing unit). For example, the preset angle threshold can be 10°. By limiting the light-emitting angle of the light-emitting unit less than the preset angle threshold, the light rays emitted by the light-emitting unit can enter the light homogenizing structure as far as possible to improve the utilization of light rays.

Figure 5B:
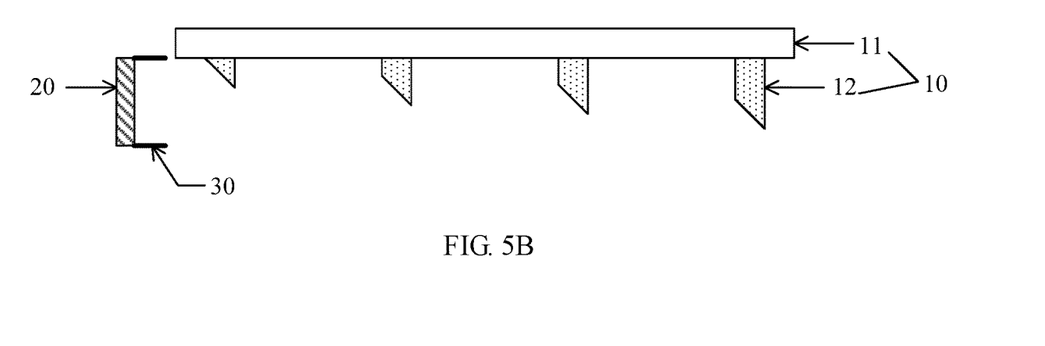
FIG. 5B is a schematic diagram showing a structure of a front light source provided according to one or more embodiment of the present disclosure.

In some embodiments of this disclosure, as shown in FIG. 5B, both sides of the light-emitting unit 20 may be provided with a light shading plate 30, the light shading plate 30 is perpendicular to the light entry surface of the light homogenizing structure, and the light shading plate is used for limiting the transmission range of the light rays. Alternatively, the light shading plate can be provided with a reflective material, and the light rays irradiated onto the light shading plate can be reflected from the light shading plate to the light homogenizing structure, thereby increasing the utilization of light rays.

Figure 5C:
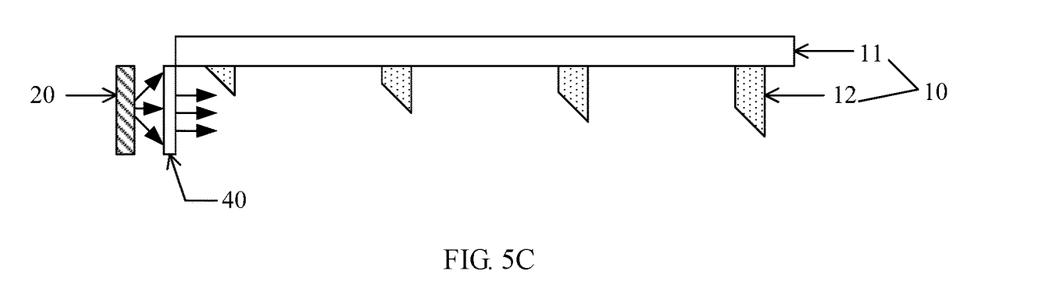
FIG. 5C is a schematic diagram showing a structure of a front light source provided according to one or more embodiment of the present disclosure.

In some embodiments of this disclosure, as shown in FIG. 5C, the front light source may include a light collimator 40 arranged between the light-emitting unit 20 and the light homogenizing structure 10. The light collimator can collimate the light rays emitted by the light-emitting unit, such that the light rays entering the light homogenizing structure are parallel light beams, so as to control an amount of light rays irradiated onto the reflective surface of each light homogenizing unit, so that each light homogenizing unit provides the target irradiation region with light of the same intensity.

To sum up, the front light source provided according to the embodiments of the present disclosure comprises a light homogenizing structure, and the transparent substrate of the light homogenizing structure is provided with a plurality of light homogenizing units, and after the light rays emitted from the light emitting element are reflected on the reflective surface of the light homogenizing unit, they are incident into the display panel to provide a light source for the display panel. Since an orthographic projection of the light homogenizing unit on the display panel is located on a border between pixels of the display panel, when the display panel displays a picture, in addition to the guaranteed light homogeneity, the light rays emitted from the display panel are not affected by the light homogenizing unit and can directly transmit through the transparent substrate. Therefore, definition of the picture is guaranteed and the display effect of the display panel is improved.

An embodiment of this disclosure provides a display device comprising a display panel and a front light source arranged on the display side of the display panel. The front light source can be a front light source as shown in any of FIG. 5A to FIG. 5C.

Alternatively, the transparent substrate in the light homogenizing structure can be a protective substrate for the display device, that is, the protective substrate of the display device and the transparent substrate in the light homogenizing structure are reused. Therefore, the thickness of the display device can be reduced to realize thinning of the display device.

Figure 6A:
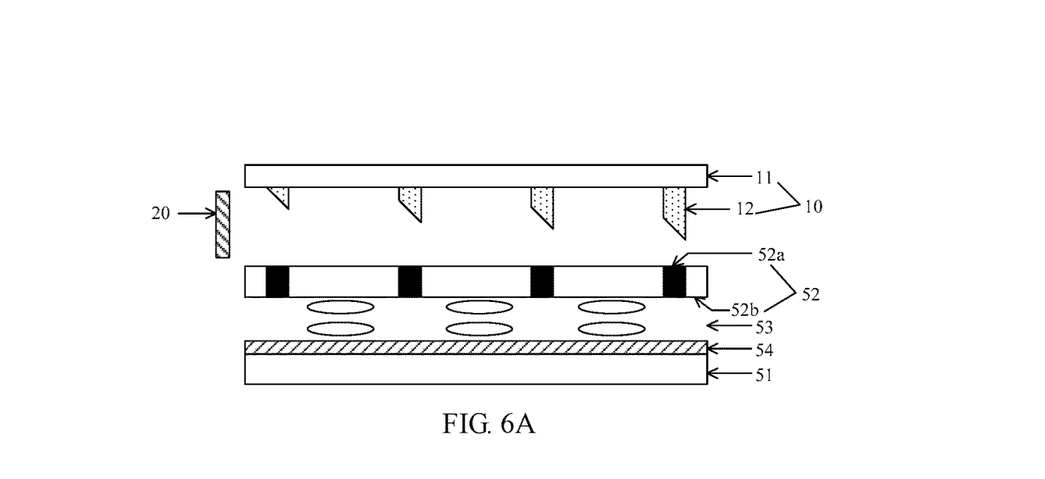
FIG. 6A is a schematic diagram showing a structure of a display device provided according to one or more embodiment of the present disclosure.

As shown in FIG. 6A, the display panel may comprise an array substrate 51, a color film substrate 52 and a liquid crystal layer 53 arranged between the array substrate 51 and the color film substrate 52. A reflective layer 54 is provided on a side of the array substrate 51 close to the color film substrate 52. Since the front light source is arranged on a side of the color film substrate away from the array substrate (i.e., the display side of the display panel), the reflective layer arranged on the array substrate can reflect the light rays incident from the display side of the display panel, thus realizing display of a picture on the display panel. In some embodiments of this disclosure, the reflective layer can be also arranged on the side of the array substrate away from the color film substrate, and the embodiments of this disclosure are not limited to it.

As shown in FIG. 6A, the color film substrate 52 comprises a black matrix 52a and a color resistance 52b, and the orthographic projection of the light homogenizing unit 12 on the display panel is located within the region in which the black matrix 52a is disposed.

Figure 6B:
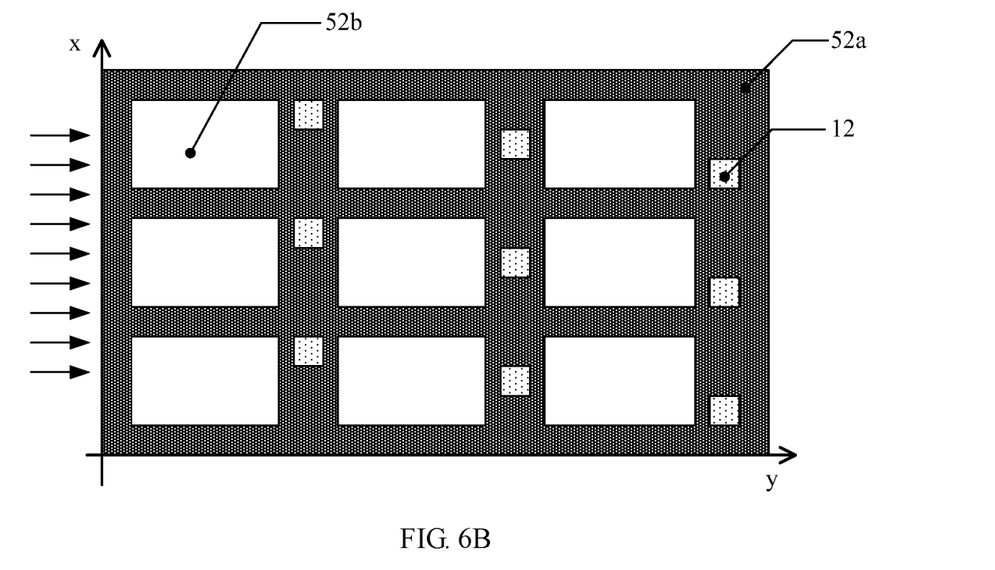
FIG. 6B is a top view of the display device shown in FIG. 6A.

Illustratively, in some embodiments of this disclosure, the light homogenizing unit in the display device is a light homogenizing unit with columnar structures as shown in FIG. 2A, and the top view of the display device shown in FIG. 6A can be shown in FIG. 6B, that is, the plurality of columnar structures specifically are a plurality of columnar structure groups A arranged in an array in the first direction x, and each columnar structure group A comprises a plurality of columnar structures 12 arranged in an array in the second direction y. The orthographic projection of each columnar structure 12 on the display panel (i.e., the color film substrate) is located within the region in which the black matrix 52a is disposed.

It should be not that, a pixel in the display panel is usually a hierarchical structure, which usually comprises a TFT structure, a pixel electrode, a liquid crystal layer, a common electrode, and a color resistance of one color. In some embodiments of the present disclosure, a black matrix is disposed at the border between pixels of the display panel, and thus the orthographic projection of the light homogenizing unit 12 on the display panel is located on a border between pixels of the display panel. Therefore, the columnar structures correspond, on a one-to-one basis, to the pixels in the display panel, that is, the columnar structures 12 correspond, on a one-to-one basis, to the color resistance 52b in the color film substrate.

To sum up, the display device provided according to the embodiments of the present disclosure comprises a light homogenizing structure, and the transparent substrate of the light homogenizing structure is provided with a plurality of light homogenizing units, and after the light rays emitted from the light emitting element are reflected on the reflective surface of the light homogenizing unit, they are incident into the display panel to provide a light source for the display panel. Since an orthographic projection of the light homogenizing unit on the display panel is located on a border between pixels of the display panel, when the display panel displays a picture, in addition to the guaranteed light homogeneity, the light rays emitted from the display panel are not affected by the light homogenizing unit and can directly transmit through the transparent substrate. Therefore, definition of the picture is guaranteed and the display effect of the display panel is improved.

Alternative embodiments of the present disclosure are described above, but they are not used to limit the present disclosure, and any modification, equivalent replacement, improvement and etc. made within the spirit and rule of the present disclosure shall fall into the scope of protection of the present disclosure.

What is claimed is:

1. A light homogenizing structure arranged on a display side of a display panel, comprising:
   a transparent substrate and a plurality of light homogenizing units arranged on a surface of the transparent substrate facing the display panel;
   wherein a surface of each of the light homogenizing units away from the transparent substrate is a reflective surface tilted relative to the transparent substrate, light rays emitted from light-emitting unit facing a light entry surface of the light homogenizing structure are incident into the display panel after being reflected on the reflective surface, the light entry surface of the light homogenizing structure is a surface of the light homogenizing structure other than a surface facing the display panel and its opposite surface, and an orthographic projection of one of the light homogenizing units on the display panel is located on a border between pixels of the display panel.

2. The light homogenizing structure according to claim 1, wherein the plurality of light homogenizing units are a plurality of columnar structure groups arranged in a first direction, each of which comprises at least one columnar structure arranged in an array in a second direction, wherein one end of each of the at least one columnar structure is arranged on the transparent substrate, and another end thereof is provided with the reflective surface;
   the first direction is parallel to the light entry surface of the light homogenizing structure, and the second direction is perpendicular to the light entry surface of the light homogenizing structure.

3. The light homogenizing structure according to claim 2, wherein when observed at least in the second direction, at least two of the at least one columnar structure in each of the columnar structure groups are arranged in a staggered manner.

4. The light homogenizing structure according to claim 2, wherein
   each of the at least one columnar structure has same height; or
   heights of at least two columnar structures in each of the columnar structure groups are increased successively in a direction away from the light-emitting unit.

5. The light homogenizing structure according to claim 2, wherein
   the columnar structures correspond, on a one-to-one basis, to pixels in the display panel.

6. The light homogenizing structure according to claim 2, wherein reflective surfaces of a plurality of columnar structures in each of the columnar structure groups are not parallel with each other.

7. The light homogenizing structure according to claim 2, wherein heights of at least two columnar structures in each of the columnar structure groups are increased successively in a direction away from the light-emitting unit, and angles between reflective surfaces of at least two columnar structures in each of the columnar structure groups and the transparent substrate are decreased successively in a direction away from the light-emitting unit.

8. The light homogenizing structure according to claim 1, wherein the plurality of light homogenizing units are a plurality of strip structures extending in a first direction and arranged in a second direction, and one surface of each of the strip structures is arranged on the transparent substrate, and another surface opposite to the surface arranged on the transparent substrate is provided with the reflective surface;
   the second direction is perpendicular to the light entry surface of the light homogenizing structure, and the first direction is parallel to the light entry surface of the light homogenizing structure.

9. The light homogenizing structure according to claim 8, wherein heights of the plurality of strip structures are increased successively in a direction away from the light-emitting unit.

10. The light homogenizing structure according to claim 9, wherein angles between reflective surfaces of at least two strip structures and the transparent substrate are decreased successively in a direction away from the light-emitting unit.

11. The light homogenizing structure according to claim 1, wherein a light shading coating is arranged between the transparent substrate and the light homogenizing structure, and an orthographic projection of the light shading coating on the transparent substrate overlaps at least partially with an orthographic projection of the light homogenizing structure on the transparent substrate.

12. The light homogenizing structure according to claim 1, wherein
   each of the light homogenizing units is made of a non-transparent material.

13. The light homogenizing structure according to claim 1, wherein the orthographic projection of the one of the light homogenizing units on the display panel is located within a region of the display panel in which a black matrix is disposed.

14. A front light source arranged on a display side of a display panel, comprising:
   a light homogenizing structure comprising:
      a transparent substrate; and a plurality of light homogenizing units arranged on a surface of the transparent substrate facing the display panel; and a light-emitting unit configured to face a light entry surface of the light homogenizing structure, the light entry surface of the light homogenizing structure is a surface of the light homogenizing structure other than a surface facing the display panel and its opposite surface, wherein a surface of each of the light homogenizing units away from the transparent substrate is a reflective surface tilted relative to the transparent substrate, light rays emitted from the light-emitting unit are incident into the display panel after being reflected on the reflective surface, and an orthographic projection of one of the light homogenizing units on the display panel is located on a border between pixels of the display panel.

15. The front light source according to claim 14, wherein a light-emitting angle of the light-emitting unit is less than a preset angle threshold.

16. The front light source according to claim 14, wherein upper and lower sides of the light-emitting unit are provided with light shading plates which are perpendicular to the light entry surface of the light homogenizing structure.

17. The front light source according to claim 14, wherein the orthographic projection of the one of the light homogenizing units on the display panel is located within a region of the display panel in which a black matrix is disposed.

18. A display device comprising a display panel and a front light source arranged on a display side of the display panel, wherein the front light source comprises:
    a light homogenizing structure comprising:
        a transparent substrate; and
        a plurality of light homogenizing units arranged on a surface of the transparent substrate facing the display panel; and
    a light-emitting unit configured to face a light entry surface of the light homogenizing structure, the light entry surface of the light homogenizing structure is a surface of the light homogenizing structure other than a surface facing the display panel and its opposite surface,
    wherein a surface of each of the light homogenizing units away from the transparent substrate is a reflective surface tilted relative to the transparent substrate, light rays emitted from the light-emitting unit are incident into the display panel after being reflected on the reflective surface, and an orthographic projection of one of the light homogenizing units on the display panel is located on a border between pixels of the display panel.

19. The display device according to claim 18, wherein the transparent substrate is a protective substrate of the display device.

20. The display device according to claim 18, wherein the orthographic projection of the one of the light homogenizing units on the display panel is located within a region of the display panel in which a black matrix is disposed.

* * * * *

UNITED STATES PATENT AND TRADEMARK OFFICE
CERTIFICATE OF CORRECTION

PATENT NO. : 10,642,102 B2  
APPLICATION NO. : 15/924650  
DATED : May 5, 2020  
INVENTOR(S) : Hongyu Zhao et al.

Page 1 of 1

It is certified that error appears in the above-identified patent and that said Letters Patent is hereby corrected as shown below:

On the Title Page

(73) Assignees, Should read:  
Boe Technology Group LTD  
Fuzhou Boe Optoelectronics Technology Co. LTD Signed and Sealed this  
Fourth Day of August, 2020

Andrei Iancu  
*Director of the United States Patent and Trademark Office*